Sept. 26, 1967 L. J. DU ROCHER 3,343,342
FILTER ASSEMBLY
Filed May 11, 1964 4 Sheets-Sheet 3

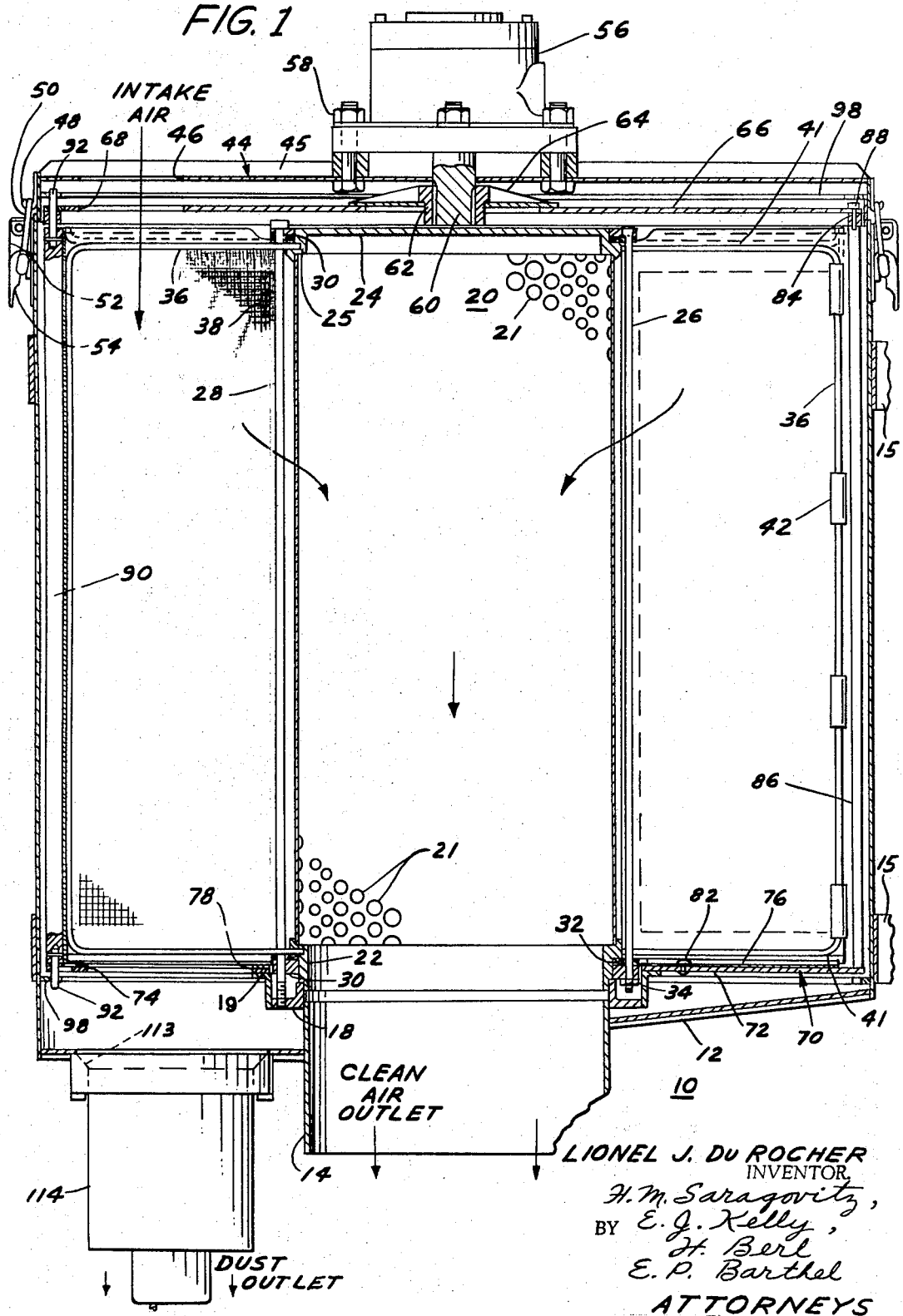

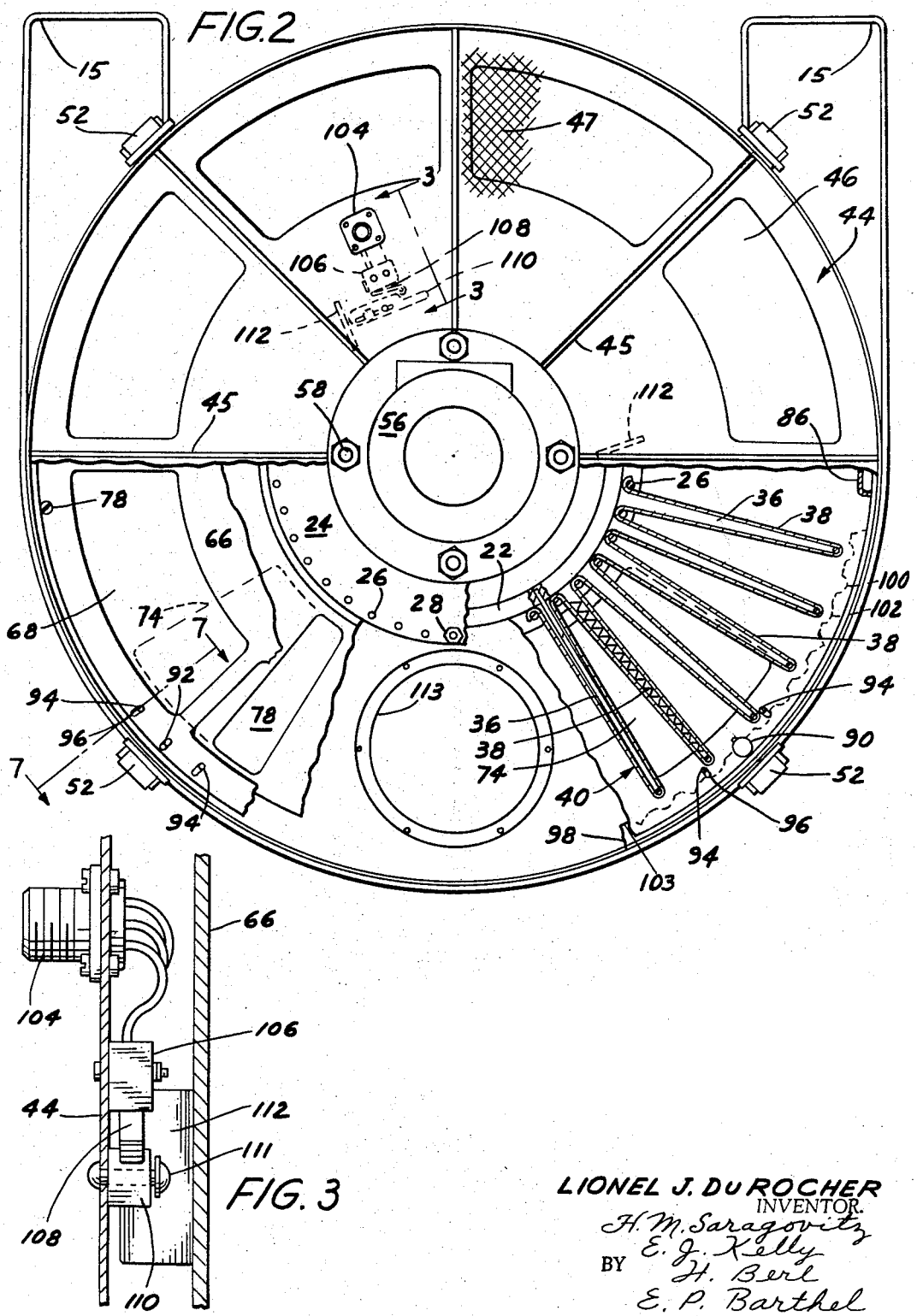

LIONEL J. DU ROCHER
INVENTOR.

BY H. M. Saragovitz
E. J. Kelly
H. Berl
E. P. Barthel
ATTORNEYS

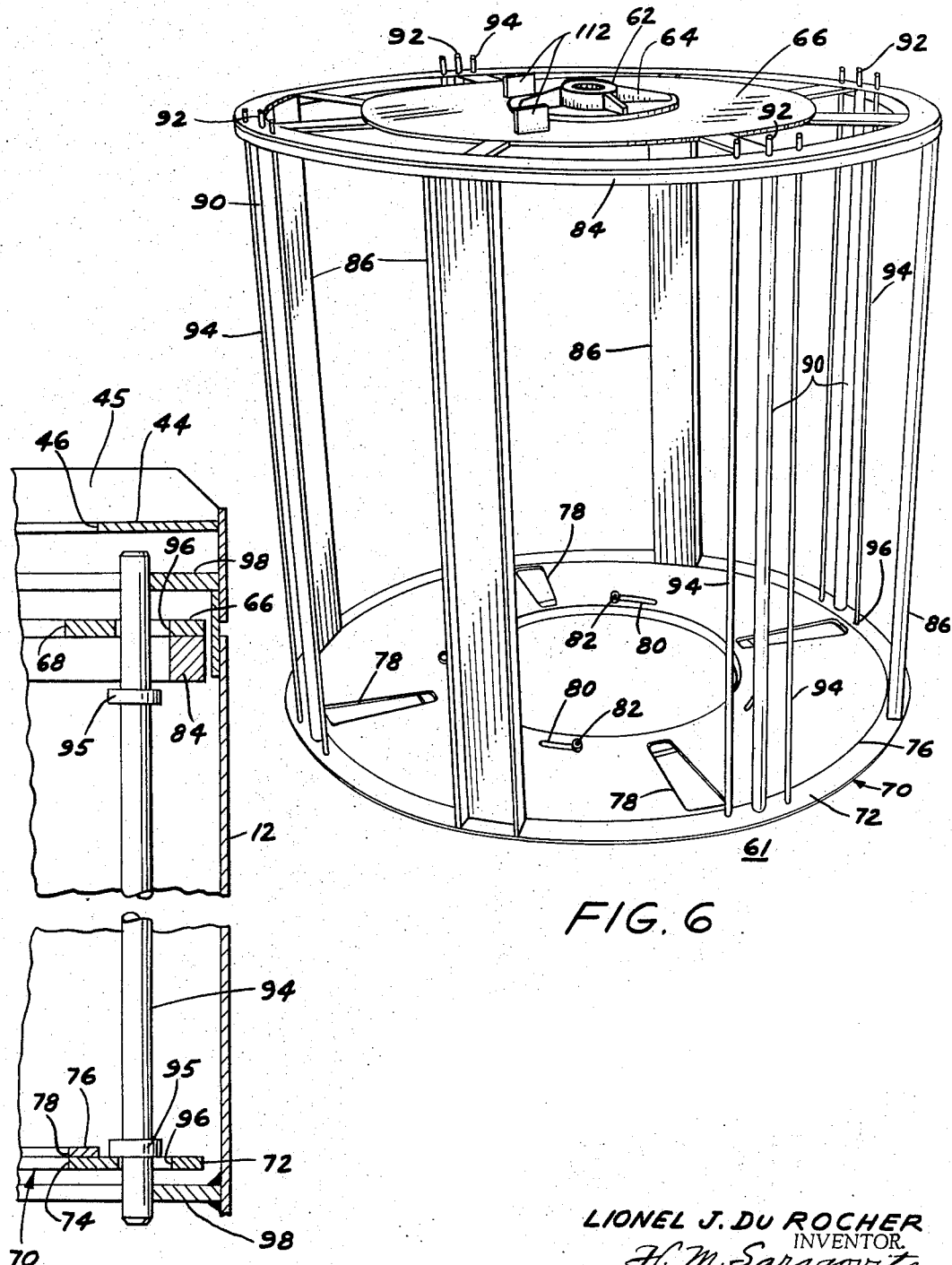

United States Patent Office 3,343,342
Patented Sept. 26, 1967

3,343,342
FILTER ASSEMBLY
Lionel J. Du Rocher, 29728 E. Jefferson Ave.,
St. Clair Shores, Mich. 48082
Filed May 11, 1964, Ser. No. 366,667
8 Claims. (Cl. 55—299)

The invention described herein may be manufactured and used by or for the Government for Governmental purposes, without the payment to me of any royalty thereon.

This invention relates to improvements in air filters for engines subject to damage from the effects of dust on the wearing parts, although it is not exclusively for this purpose and is intended for use with other devices and means requiring a supply of clean air, as will be apparent to one skilled in the art. In particular the invention relates to improvements in a dry-type air filter for gas turbine engines, and specifically with a novel means for self cleaning the filter element.

One of the major problems of the gas turbine engine which has prevented or delayed use in military ground power applications is vulnerability to dust ingestion. Tests of selected small gas turbines, under actual and simulated field environments, have shown that under even mild dust conditions (i.e., particle sizes of less than ten microns in concentration as low as .001 gram/cu. ft.) severe damage can occur in aerodynamic flow passages in a relatively short time unless the engines are adequately protected with effective air filtration.

At present, air filters used in internal combustion engines embodying the dry-type filter element require replacement after clogging of the filtration area by dust particles. Attempts to use a similar type of air filter for gas turbine engines have proved unsuccessful as regards the length of operating time before the restriction point of the filter is reached. This is because of the relatively enormous quantities of combustion air required for the gas turbine engine. For example, a reciprocating gasoline engine of equal rated power requires about 370 c.f.m. of air for full power in contrast with 2350 c.f.m. of air for the turbine engine. The result is that when conventional filter elements are used on gas turbine engines employed for powering vehicles the operating time of the vehicle is reduced to a point of impracticality. This is especially true in military vehicles using gas turbine engines requiring in excess of 3500 c.f.m. of clean air.

It is accordingly an object of the present invention to provide a self-cleaning air filter apparatus having a filtration area comprising radiating flexible fins which are deflected to produce momentary vibratory movement followed by interrupting or jolting means to shake free accumulated dust particles from the filtration area.

A further object of the invention is to provide an improved, efficient and generally self-cleaning air filter apparatus of the character described which combines the mechanical jolting of the resilient fins together with a concentrated blast of secondary air to dislodge and carry away dust particles.

A further object of the invention is to provide an air filter of the character described in which the separate deflecting and jolting means are automatically moved into and out of contact with the fins during rotational movement whereby the fins are cleaned in sequence.

Another object of the invention is to provide a self-cleaning air filter of the character described in which the cleaning means can be automatically rotated in either direction to duplicate the cleaning operation on the remaining filtration area associated with each of the fins.

Further objects and advantages of the present invention will be apparent from the following description, reference being had to the accompanying drawings, wherein a preferred embodiment of the present invention is clearly shown.

In the drawing:

FIG. 1 is a part section, part elevation showing an air filter assembly containing a self-cleaning insert constructed according to the invention.

FIG. 2 is a top elevation showing the filter assembly in elevation in the upper half while the lower half shows the cover removed with portions of the internal structure broken away for purposes of clarity.

FIG. 3 is an enlarged vertical section taken on the line 3—3 of FIG. 2 showing the control circuit mechanism.

FIG. 6 is a perspective view showing the carrier unit as separated from the housing in which it is mounted.

FIG. 7 is an enlarged vertical section taken on the line 7—7 of FIG. 2 showing the stop-rod mounting structure.

Figure 4:
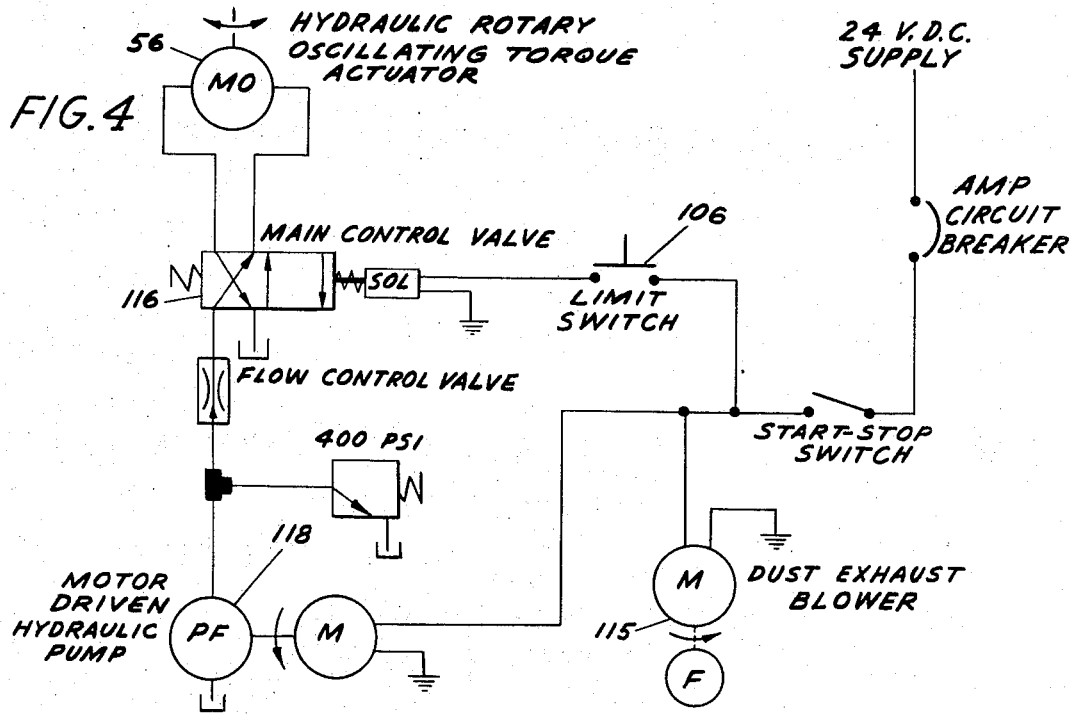
FIG. 4 is the control circuit schematic of the air cleaner.

Referring now in detail to the drawing, and more particularly to FIG. 1, 10 denotes a self-cleaning air filter. The filter housing 12 is generally cup-shaped having its end face formed with a circular opening in which a clean air outlet pipe 14 is welded in coaxial relationship with the housing. Brackets 15 composed of steel straps are welded around the exterior of the housing and formed at their ends for attachment to a vertical surface. The air outlet pipe 14 is adapted to be connected to the air intake induction system of a gas turbine engine, for example.

A filter insert of the radial fin type is mounted in the housing by means of collar 18 welded to pipe 14 and having a channel shaped cross-section supporting a seating flange 19. The filter insert comprises an inner frame cylindrical tube 20 formed from perforated sheet metal. The perforations 21 for the passage of primary air into the tube are only partially indicated in FIG. 1. The base of the tube 20 is joined to a connecting ring 22 provided with a reduced extension that is permanently seated within the collar 18. The upper portion of the tube 20 is sealed by a circular cap plate 24 having a depending flange 25. The connecting ring 22 and the cap 24 are clamped and sealed to the tube 20 by means of a plurality of radially spaced bolts 26 passing through apertures in the upper and lower rings 30 and seals 32 and held by nuts 34. Four equally spaced screw bolts 28 are of a length sufficient to threadably engage the collars 18 to removably hold the filter insert in fixed relation to the housing.

A plurality of flexible U-shaped spring wire brackets 36 extend radially outward from the tube unit 20. The brackets are anchored in a cantilevered manner from the tube by inserting their extremities within bored holes located in the flange 25 and connecting ring 22. A fabric filter material 38, such as felt, is arranged in zigzag manner by being passed around the inside of bolts 26 and the outside vertical portion of brackets 36. As shown in FIG. 2 by way of a partial representation of the filter element, the fabric, under tension, provides an unbroken conforming cover forming radially-directed and axially extending fins 40. As an example of the efficiency of such an arrangement, applicant's pleated felt material provides approximately 67 square feet of filtration area. The fabric extends above and below the horizontal portions of the brackets 36 a sufficient amount to form a flexible extension 41 for a purpose to later appear. The extensions are closed by metal staples and sealed by a suitable sealing compound. Protective guards, such as a series of spring clips 42, are removably mounted on the extremities of the fins.

A cover 44, having inlet openings 46 covered by protective screens 47, encloses the open end of the housing 12. Four equally spaced hook members 48 are welded to the side flange of the cover to be engaged by pivotal clamps 50 secured to the housing. The clamps are latched in the conventional manner by links 52 and manually operated levers 54. Disposed centrally of the housing 12 and secured to the outside of the cover 44 is a hydraulic rotary reversing motor 56. The motor or actuator is secured to the cover by means of bolts 58.

The motor 56 has its splined output drive shaft 60 extending through a central opening in the cover and engaging a rotatable carrier unit 61 (shown in FIG. 6) by means of splined hub 62. The carrier unit is disposed concentrically within the housing while surrounding the filter insert. The hub 62 is welded by means of gusset plate 64 to circular drive plate 66. The drive plate has openings 68 (shown in FIG. 2) which are of a size to allow the intake air to flow at maximum efficiency into the fins 40. Carrier unit 61 has a lower assembly 70, which includes support plate 72 and control plate 76, located below the filter.

Figure 5:
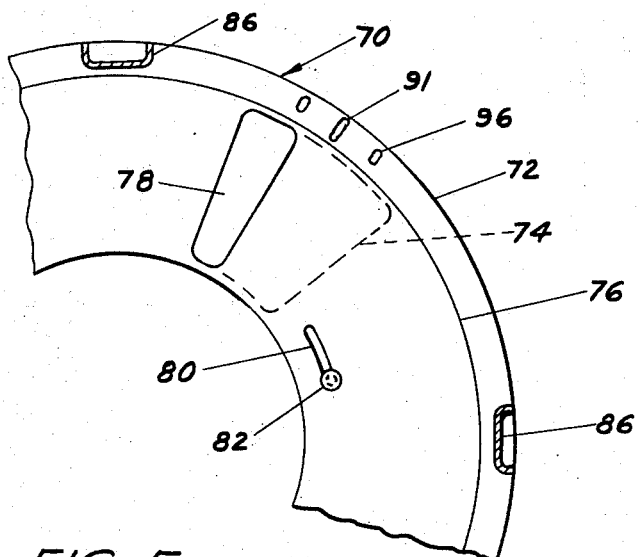
FIG. 5 is a fragmentary plan view of the lower carrier assembly.

As can be seen best in FIG. 6, the overlying control plate 76 has a plurality of orifices 78, in this case four in number spaced 90° apart. The orifices 78 in the control plate are located coincident with four orifices 74 in the support plate (see FIG. 5) but are reduced in size approximately one-third for a purpose to be explained shortly. The control plate has four arc shaped openings as shown at 80 for the reception of connecting rivets 82. The rivets 82 hold the plates 72 and 76 in fixed relation after rivets 82 reach the ends of openings 80 while permitting relative rotational movement of the control plate a distance equal to the length of the slot. The openings 80 are of a length to allow the reduced orifices 78 to be rotated from one side of its associated orifice 74 to the opposite side while maintaining an unobstructed passage of air through the smaller opening. The movement of the control plate in relation to the support plate is accomplished by the frictional drag produced by the contact between the broom-like fabric extensions 41 opposing the rotational movement of the control plate. With each reversal of the motor 56 the control plate is held against rotational movement until the support plate and its rivets 82 are moved through the length of the openings 80. The two operating limits of the control plate are illustrated in FIGS. 5 and 6.

The plates 66 and 72 are moved in unison by having the support ring 84 welded to four vertical channel members 86 which are in turn welded to the lower plate 72. Screws 88 are employed to removably secure plate 66 to the ring 84. The carrier unit 61 is supported for rotation on the machined upper surface of seating flange 19.

Vertical bars, consisting of four banks of three bars each, are equally spaced around the carrier unit as seen in FIG. 6. The central flipper, or vibrator bar, 90 of each bank is rotatably mounted between the plates 66 and 72 by means of pins 92 extending through radial slots 91. The outside pair of strikers, or stop bars, 94 of each bank, one of which is shown in detail in FIG. 7, are supported for radial movement by collars 95 in the radial slots 96. The flipper or vibrator bars 94 are supported in the same manner as stop bar 90, and pins 92 are, in actuality, merely extensions of bars 90 similar to the extensions of bars 94 above and below collars 95 as shown in FIGURE 7. It will be noted that each bank of rods is positioned opposite an orifice 74 by having the radial centerline of the central slots 91 coincide with the radial centerline of the orifices 74.

The bars 90 and 94 are arranged whereby their upper and lower extremities are in continuous contact with cam rings 98. The upper ring 98, only a portion of which is shown in FIG. 2, is welded to the inside of cover 44. The lower ring 98 is similarly welded around the inner periphery of the housing and located below the filter insert. The cam rings 98 have a continuous series of matched alternating deep indents 100 and shallow indents 102. The filter is orientated whereby the shallow indents 102 are located on the radial centerlines of the fins and the deep indents 100 are spaced between the fins. It can thus be seen that during rotation of the carrier 61 the bars are moved in and out of contact with the extremities of the fins 40.

In the operation of the particular embodiment shown in the drawings the bars are rotated through a 90° segment after which the hydraulic motor is reversed by the activation of the control circuit shown in FIG. 4. Depending upon the direction of rotation, each flipper bar 90 cooperates with its associated following striker bar 94 to remove dust particles from the fins in a particular quadrant.

When the carrier 61 travels in a counter-clockwise direction, the first step in the cleaning sequence is shown in FIG. 2. Bar 90, by means of holding pins 92, is positioned in deep indent 100 when it is withdrawn from engagement with the fins. It associated trailing striker bar 94 is in contact with the inner edges of the cam rings 98. As the bar 90 approaches a fin, the pins 92 are guided out of their deep positions and into the shallow fin engaging indents 102. As the fin deflects, the bar 90 moves out of the engaging indent 102 thus maintaining contact with the fin. Upon entry of the pins 92 into the withdrawing indents 100 the fin will be released and snap-back past its neutral position. The following striker bar, in contact with edge 103, will block the movement of the fin.

The contacted fin will be set into vibratory motion as a result of the flipping action of the bar 90. However, by the resultant interposing of the striker bar 94 into the path of movement of the vibrating fin, a sudden striking or jolting reaction is produced. The result of this reaction force causes a jarring of the filter cloth covering the fin which will dislodge accumulated dust particles from the cloth. The freed particles will be caught by a secondary air stream created by an aspirator fan located in the conduit 114. As a consequence the particles of dust will be drawn between the fins and through the orifices 78 and 113 into the dust outlet.

This is repeated until all the fins in each 90° quadrant have been deflected, released and jolted. During the clockwise movement, the control plate 76 is shifted to the position shown in FIG. 5 so that it can now direct the secondary dust removing air stream past the fins striking the opposite striker bar 94 of each bank. It can thus be seen that by applicant's arrangement the combined effect of the dislodging bars together with the concentrated secondary air suction stream removes the dust restriction built upon the filtration area. The accumulation of removed dust particles on the plate 76 will be removed by the sweeping action of the filter cloth extension 41 in relation to the rotating carrier.

Reciprocation of the motor 56 is controlled by a single slide rod limit switch shown in detail in FIG. 3. The receptacle 104 supplies power to the micro switch 106 which has a leaf spring actuator 108 provided with an engaging roller at its free end. As the carrier completes its 90° travel, a projecting lug 112 attached to plate 66 is brought into contact with one end of the slide rod 110. The resultant movement of the roller along the stepped surface of the slide rod makes and breaks the micro switch contacts.

As can be seen in the control circuit schematic of FIG. 4, the limit switch operates a single solenoid control valve 116 which in turn controls the direction of rotation of the hydraulic motor 56 by controlling the path of fluid flow from the hydraulic pump to the motor 56 as shown by the arrows in valve 116. A motor driven hydraulic pump 118 is used to supply oil to the circuit The aspirator motor is indicated at 115 and is wired to start operation with activation of the hydraulic motor 56.

With the particular form of the invention disclosed, a large torque load is placed on the motor 56 in order to move the control plate 76 in relation to the support plate 72. Accordingly, it is possible to decrease this load by making plates 72 and 76 integral. In this arrangement the orifices 78 are fixably located in a central position with relation to each of the four banks of bars by being on the radial center line of the bars 90. It will be seen that in this form the secondary air will pass in proximity to the fin being jolted whether the carrier is travelling in a clockwise or counter clockwise direction.

In some instances, it may be desirable to modify the operation of the air cleaner by fixably positioning the bars 90 and 94 to the carrier 61 to prevent their radial movement. It will be apparent that in this form of the invention the degree of flexibility of the brackets 36 could be increased, if necessary, in order to allow them to flex past the rotating bars. It is also apparent that in this form of the invention the cam rings 98 would be eliminated from the assembly to allow unobstructed travel of the bars 90 and 94. In all other respects the operation of a radial fixed bar arrangement is exactly as described for the invention as previously set forth.

It will thus be seen that I have provided a simple air cleaner device which operates automatically to prevent clogging or restriction of the filtration area. It will be apparent that the illustrative embodiment of the invention described above is susceptible to various modifications within the purview of the invention. Thus, an alternate apparatus would be to have the bars stationary and rotate the filter element. Accordingly, the invention is not limited to the embodiment shown and described but is to the scope defined in the appended claims.

I claim:
1. In a self-cleaning air filter, a housing, a plurality of circumferentially spaced bolts attached to said housing, a plurality of radially extending resilient brackets anchored in said housing and spaced from said bolts, a filter material mounted on said brackets and said bolts defining radial fins, means for moving a first flow of particle-laden air over said radial fins and through said filter material, thereby entrapping particles on said filter material, a first means mounted for movement in opposed directions in said housing for individually bending each of said radial fins away from its radial direction when in contact with one end of said radial fin and for causing a vibrational snap movement of each said radial fin upon withdrawal from contact therewith, a second means mounted for movement in said housing for stopping the vibrational snap movement of each said radial fin by collision therewith when said first means is moving in a first direction, a third means mounted for movement in said housing for stopping the vibrational snap movement of each said radial fin by collision therewith when said first means is moving in a second direction, said collision causing dislodging of the entrapped particles from said filter material, and means for moving said first, second, and third means in said first and second directions.

2. The air filter of claim 1 wherein said first, second, and third means comprise parallel bars which are mounted on a rotatable carrier unit.

3. The air filter of claim 2 wherein said bars are radially movable within said rotatable carrier unit and wherein said bars are acted upon for radial movement by a cam fixed in said housing.

4. The air filter of claim 2 wherein said rotatable carrier unit has an aperture therein radially inward from said parallel bars for reception of the dislodged dust.

5. The filter of claim 4 wherein there is a plurality of groupings of said parallel bars each grouping having an aperture for cooperation therewith.

6. The air filter of claim 1 wherein said moving means is a reversible motor means mounted on said housing, a switching means is mounted on said housing for reversing said motor means, and actuating means is connected to said first means for actuating said switching means to a plurality of positions upon movement of said first means a predetermined distance.

7. The air filter of claim 6 wherein said first, second, and third means are mounted on a rotatable carrier unit which has an aperture therein below said radial fins and radially inward from said first, second, and third means, and means for drawing a second flow of air over said radial fins and through said aperture in said rotatable carrier unit for removal of the particles dislodged from said radial fins.

8. The air filter of claim 7 wherein said rotatable carrier unit has a control plate mounted thereon for partial rotation relative thereto, said control plate having an aperture therein which is smaller in size than the aperture in said rotatable carrier unit but which forms a continuous passage for said second air flow with said rotatable carrier unit aperture regardless of the rotative position of said control plate relative to said rotatable carrier unit, whereby said second air flow is held to a small quantity relative to said first air flow and the continuous passage formed by said apertures is always below the said radial fin from which particles are being dislodged regardless of the direction of movement of said first, second, and third means.

References Cited
UNITED STATES PATENTS

| | | | |
|---|---|---|---|
| 704,724 | 7/1902 | Whitney | 55—286 |
| 1,286,458 | 12/1918 | Warren | 55—300 |
| 1,288,614 | 12/1918 | Kern | 55—304 |
| 2,196,839 | 4/1940 | Seng | 55—300 |
| 2,519,082 | 8/1950 | Stevenson | 55—304 |
| 2,723,726 | 11/1955 | Pellon | 55—827 |
| 2,912,159 | 11/1959 | Ganger et al. | 55—467 |
| 3,056,504 | 10/1962 | Lavellee | 210—393 |
| 3,186,389 | 6/1965 | Sylvan | 55—290 |

HARRY B. THORNTON, *Primary Examiner.*

B. NOZICK, *Assistant Examiner.*